United States Patent [19]

Greene

[11] Patent Number: 5,115,237

[45] Date of Patent: May 19, 1992

[54] COMBINATION AIRCRAFT YAW/ANGLE OF ATTACK SENSOR

[75] Inventor: Leonard M. Greene, Scarsdale, N.Y.

[73] Assignee: Safe Flight Instrument Corporation, White Plains, N.Y.

[21] Appl. No.: 509,140

[22] Filed: Apr. 16, 1990

[51] Int. Cl.[5] .............................................. G08B 23/00
[52] U.S. Cl. ................................ 340/967; 340/968; 244/1 R; 244/181; 244/82; 73/186
[58] Field of Search ............... 380/967, 968; 244/1 R, 244/180, 181, 82; 73/186, 178 R

[56] References Cited

U.S. PATENT DOCUMENTS

| | | | |
|---|---|---|---|
| 3,079,105 | 2/1963 | Raspet | 340/967 |
| 4,230,290 | 10/1980 | Townsend et al. | 340/967 |
| 4,648,569 | 3/1987 | Stewart | 340/967 |
| 4,814,764 | 3/1989 | Middleton | 340/967 |

Primary Examiner—Donnie L. Crosland
Attorney, Agent, or Firm—Edward A. Sokolski

[57] ABSTRACT

An improved aerodynamic vane is used for sensing the angle of attack of an aircraft during yawed flight. Left and right sensors are rotatably mounted to opposite sides of the fuselage of the aircraft and rotate in the air flow to a position indicative of the angle of attack of the aircraft. Each sensor consists of an arm rotatably attached at one end to the aircraft with a vane at the other end of the arm, which vane is canted at an angle with respect to the axis of rotation of the arm. The vanes on the sensors on the opposite sides of the aircraft are both canted down or up as to cause the sensors to take similar angular positions during yawed flight.

4 Claims, 4 Drawing Sheets

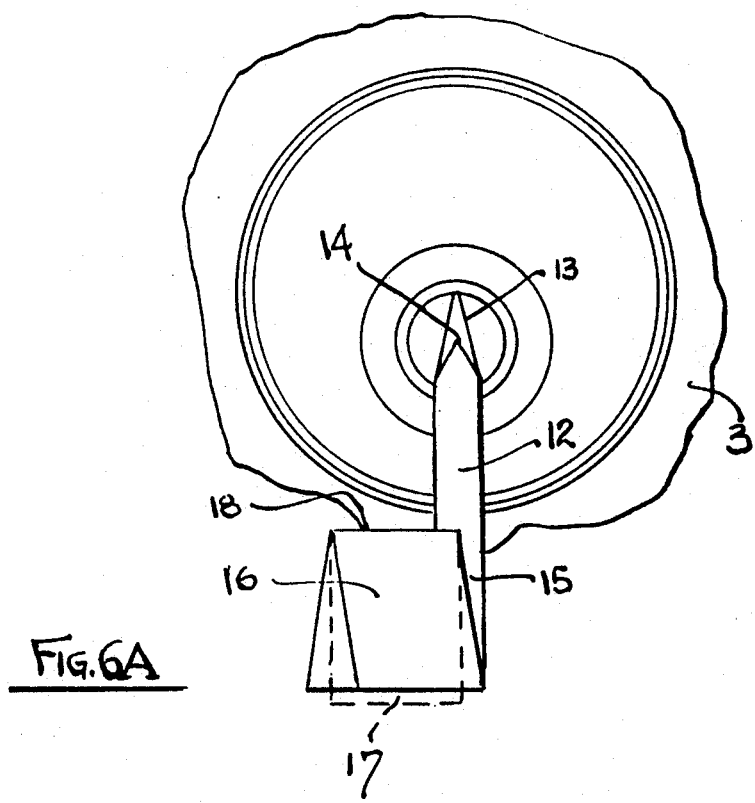
FIG.6A
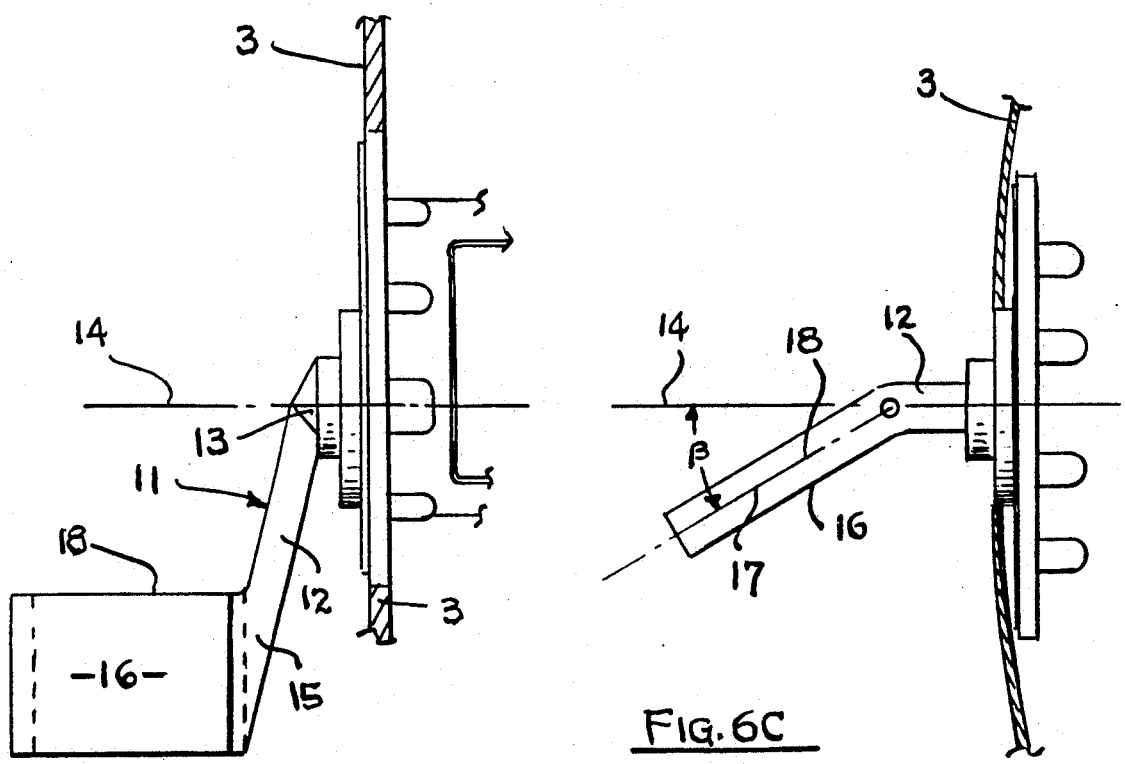
FIG.6B
FIG.6C

COMBINATION AIRCRAFT YAW/ANGLE OF ATTACK SENSOR

BACKGROUND OF THE INVENTION

1. Field of the Invention

This invention pertains to aerodynamic "wind" vanes used for sensing the direction of air flow along the exterior surface of the fuselage of an aircraft as part of a stall warning system. The stall warning system provides a warning to the pilot by means of a "stick shaker" or a warning horn when the flight attitude of the aircraft is approaching an aerodynamic stall. In response to the warning, the pilot can then alter the attitude of the aircraft so as to avoid the impending aerodynamic stall.

2. Description of the Prior Art

FIGS. 1—3 depict sensors that have typically been used in the prior art to sense the angle of attack of an aircraft. For the purpose of illustration, the physical size of the sensors has been greatly exaggerated in these figures relative to the size of the aircraft. Referring to FIGS. 1 and 2, port sensor 1 and starboard sensor 2 are rotatably attached to the exterior surface of the fuselage 3 of aircraft 4. Sensors 1 and 2 are located on opposite sides of the fuselage and their axes of rotation may or may not coincide with each other depending upon whether the exterior surfaces of the fuselage at the points of attachment are parallel to each other. Sensor 1 consists of an arm 5 that is rotatably attached at its end 6 to the fuselage 3 so that it has an axis of rotation 7. A vane 8 is attached to end 9 of the arm.

As depicted in FIG. 2, in the prior art, vane 8 typically has a wedge-shaped or triangular cross section and plane 17 passing through the center line 10 of the vane 8 also passes through and contains the axis of rotation 7.

During flight, sensor 1 responds in the manner of a wind vane to the flow of air along the exterior surface of the aircraft and the angular position of the vane is indicative of $\alpha$, the angle of attack of the aircraft as depicted in FIG. 2.

In the prior art, for the purpose of providing reliability, two sensors are used, one located on each side of the aircraft. The angular position of each sensor is then compared with the other as a means of confirming the accuracy of the indications. This comparison provides a reliable means of confirmation when the yaw angle of flight is substantially zero, i.e. when the aircraft is moving straight forward through the air. However, for a non-zero yaw angle of flight as depicted in FIG. 5, the air stream is asymmetrical relative to the aircraft and causes the port sensor 1 to exhibit an angular position differing from that of the starboard sensor 2.

A third sensor located on the top or the bottom of the fuselage has been used in the prior art to sense the angle of yaw. The yaw angle is then used to predict the difference in angle between the port and starboard sensors that would be expected in normal operation during yawed flight and thereby provides a means for confirming the proper operation of the sensors. The addition of a yaw vane, however, complicates the system and reduces the overall reliability of the stall warning system.

SUMMARY OF THE INVENTION

Instead of using a third sensor to sense the angle of yaw, the present invention utilizes an angle of attack sensor that has a vane that is canted relative to the axis of rotation of the sensor. In yawed flight the canted vane interacts with the air flow so that the port and starboard sensors exhibit similar rotation angles for a given angle of attack.

BRIEF DESCRIPTION OF THE DRAWINGS

FIGS. 6 *a, b,* and *c* are side, top and front views, respectively, of the sensor of this invention.

DETAILED DESCRIPTION

Figure 1:
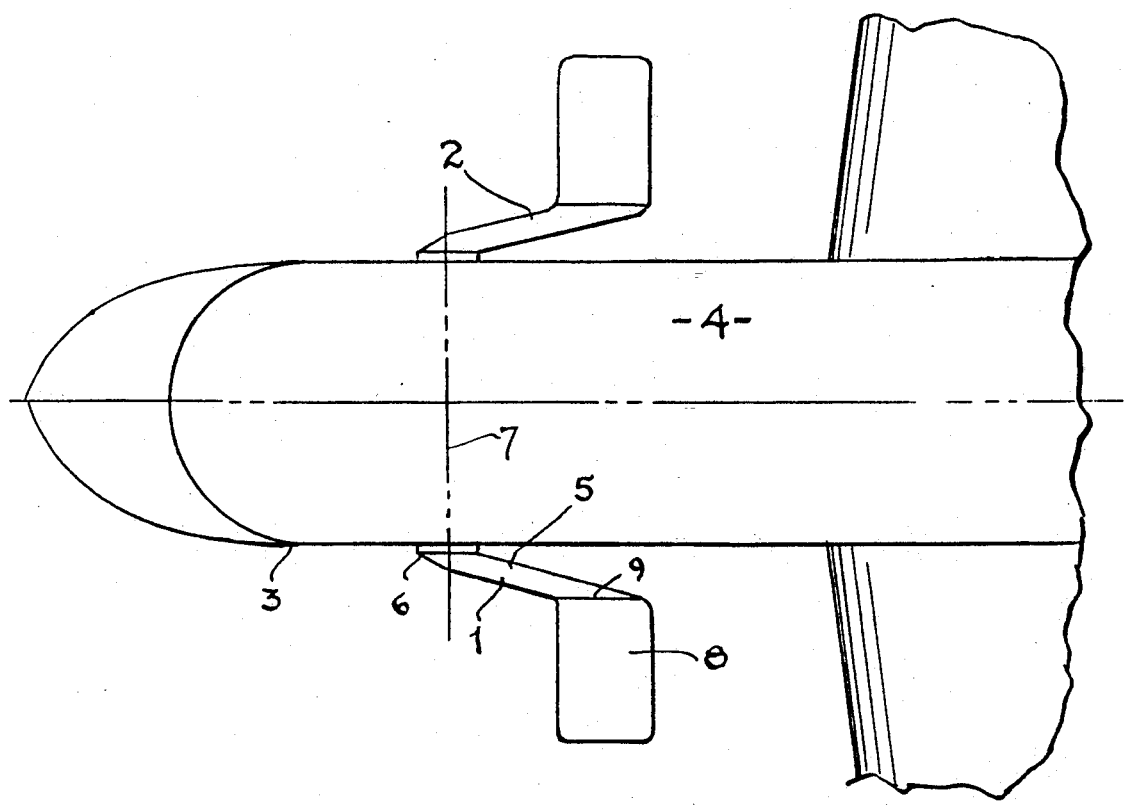
FIGS. 1 and 2 depict the sensors used in the prior art for sensing the angle of attack.
Figure 2:
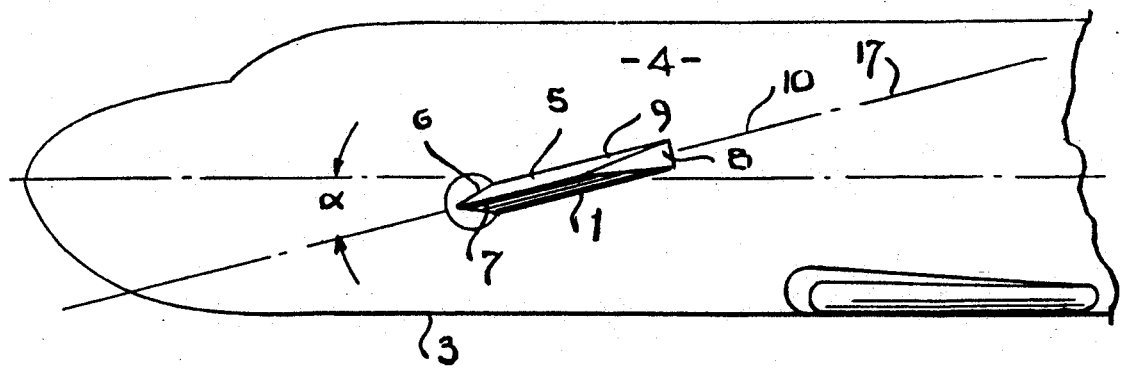
Figure 3:
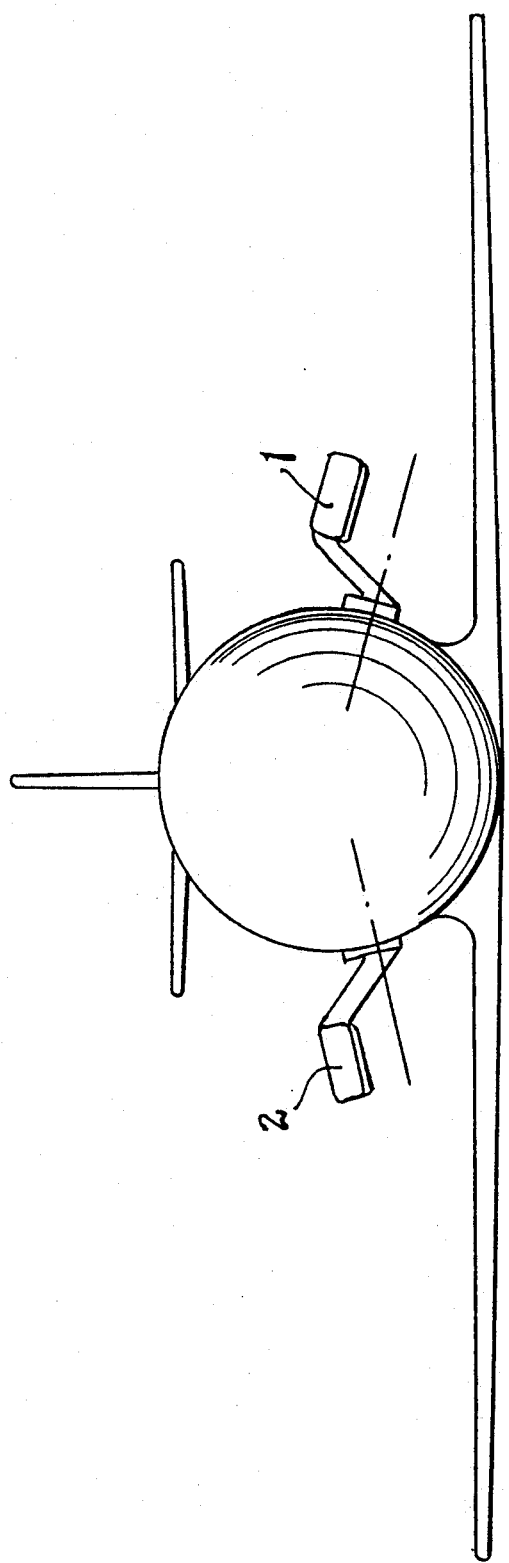
FIG. 3 is a front view of the aircraft depicting the sensors of the prior art during flight with zero yaw angle.
Figure 4:
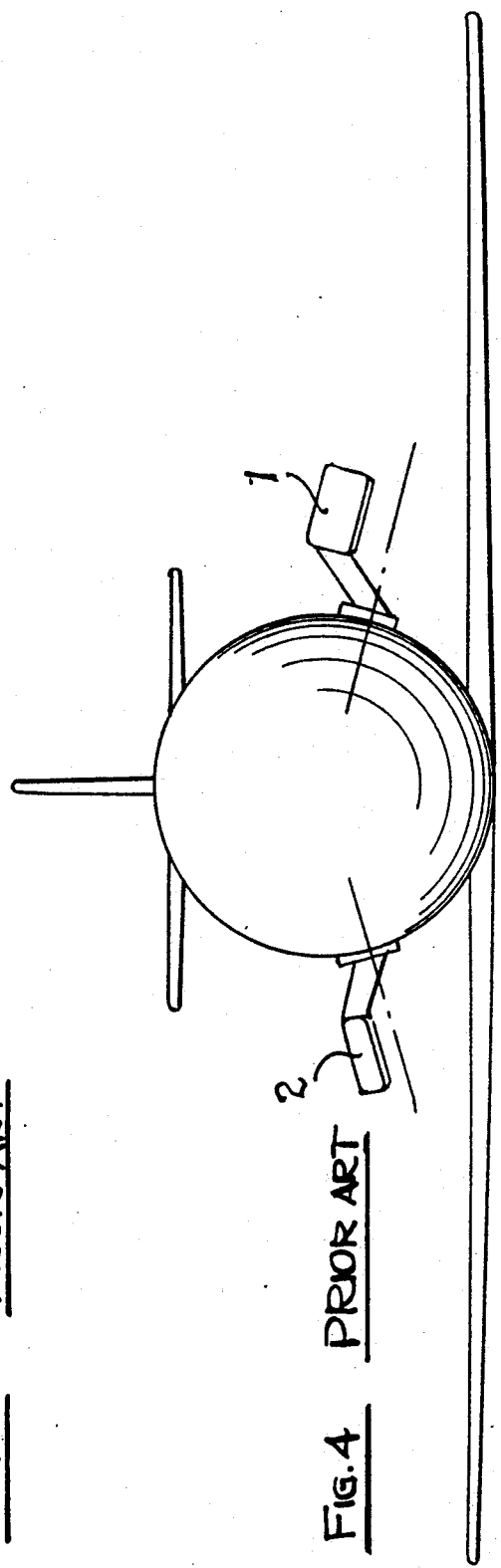
FIGS. 4 and 5 depict the sensors of the prior art during yawed flight.
Figure 5:
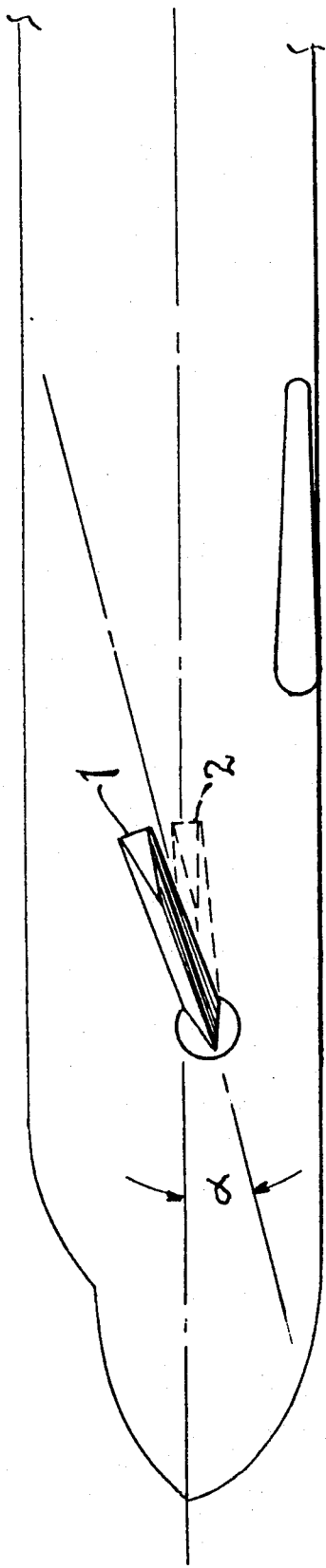

FIG. 3 depicts the similar angular positions of sensors 1 and 2 of the prior art for a zero angle of yaw and FIGS. 4 and 5 depict the angular orientation of the sensors of the prior art during yawed flight. Because of the assymetrical air flow, the angular positions of the two sensors do not agree in yawed flight. As a consequence, a simple comparison of the angles of sensors 1 and 2 suggests erroneous operation.

FIGS. 6 *a, b,* and *c* depict the sensor of the present invention. Referring to FIG. 6*b*, the sensor 11 comprises an arm 12 having one end 13 rotatably attached to the fuselage 3 and having an axis of rotation 14. A vane 16 is attached to the other end 15 of arm 12. As depicted in the front view in FIG. 6*c*, the leading edge 18 of vane 16 and plane 17, which passes through edge 18 and is a plane of symmetry of vane 16, are canted at an angle, to the axis of rotation 14. The angle, $\beta$, between the axis of rotation 14 and plane 17 is referred to therein as the "angle of cant".

Figure 7:
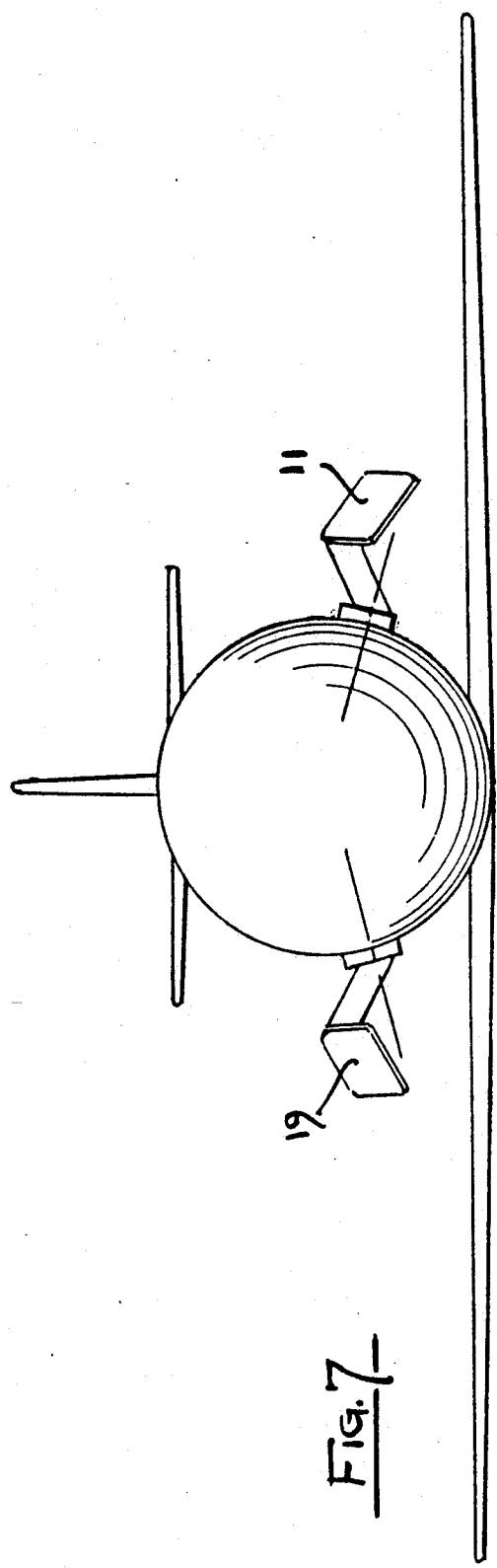
FIG. 7 is a front view of the aircraft depicting the sensors of this invention during yawed flight.

FIG. 6*a* is a side view of the sensor of this invention. FIG. 7 depicts the angular orientation of the left and right sensors of this invention in a front view of the aircraft during yawed flight. As indicated in FIG. 7, the vanes in the port sensor 11 and starboard sensor 19 are both canted downward so that port sensor 11 and starboard sensor 19 are mirror images of each other. The angle of cant, $\beta$, for each sensor may be either downward or upward depending upon whether the sensors are located somewhat below or above the aerodynamic center of the aircraft and depends upon the airflow at the sensor locations during yawed flight. For a particular location of the sensor on he aircraft the angle of cant, $\beta$, is adjusted in the range of from 0 to 45 degrees, either plus or minus, so as to make the angle of rotation of the port and starboard sensors be in substantial agreement for the range of yaw angles of flight which normally can be expected. The canted sensors accomplish this agreement by responding to the component of airflow direction which is not perpendicular to the axis of rotation of each vane and arm.

I claim:

1. A device for sensing the angle of attack of an aircraft, the device comprising, a sensor comprising an arm (12) rotatably attached at one end to the exterior surface of the aircraft and having an axis of rotation (14), and a vane (16) fixedly attached to the other end of the arm (12), said vane (16) having a leading edge (18) and a plane of symmetry (17) which passes through said leading edge (18), the plane of symmetry (17) of said vane (16) being canted at an angle to the axis of rotation (14) of the arm (12).

2. Advice according to claim 1 wherein the plane of symmetry (17) of said vane (16) is canted to the axis of rotation (14) at an angle between 5 and 45 degrees.

3. A device for sensing the angle of attach of an aircraft, the device comprising a first sensor and a second sensor, the first and second sensors each comprising an arm (12) rotatably attached at one end thereof to the exterior surface of the aircraft and having an axis of rotation (14), and having a vane (16) fixedly attached to the other end of the arm (12), said vane (16) having a leading edge (18) and a plane of symmetry (17) which passes through said leading edge (18), the plane of symmetry (17) of the vane (16) being canted at an angle to the axis of rotation (14) of the arm (12), the first sensor being substantially a mirror image of the second sensor and the first and second sensors being rotatably attached to opposite sides of the aircraft.

4. A device according to claim 2 wherein the plane of symmetry (17) of the vane (16) of the first sensor is canted to the axis of rotation (14) of the first sensor at an angle of between 5 and 45 degrees and the plane of symmetry (17) of the vane (16) of the second sensor is canted to the axis of rotation (14) of the second sensor at substantially the same angle.

* * * * *